US011377169B2

(12) United States Patent
Wakeham et al.

(10) Patent No.: US 11,377,169 B2
(45) Date of Patent: Jul. 5, 2022

(54) BICYCLE CRANKARM AND RELATED CRANKSET

(71) Applicant: Campagnolo S.r.l., Vicenza (IT)

(72) Inventors: Keith Joseph Wakeham, Calgary (CA); Fabiano Fossato, Campagna Lupia (IT)

(73) Assignee: CAMPAGNOLO S.R.L., Vicenza (IT)

(*) Notice: Subject to any disclaimer, the term of this patent is extended or adjusted under 35 U.S.C. 154(b) by 291 days.

(21) Appl. No.: 16/407,607

(22) Filed: May 9, 2019

(65) Prior Publication Data
US 2019/0344858 A1 Nov. 14, 2019

(30) Foreign Application Priority Data
May 11, 2018 (IT) .......................... 102018000005297

(51) Int. Cl.
H02J 7/00 (2006.01)
B62M 3/00 (2006.01)
B60L 53/00 (2019.01)
B62M 3/16 (2006.01)
B62M 6/40 (2010.01)
B62M 6/80 (2010.01)
B62M 6/90 (2010.01)
H01R 13/22 (2006.01)
H01R 13/62 (2006.01)
B62J 45/411 (2020.01)
B62J 45/421 (2020.01)

(52) U.S. Cl.
CPC .............. *B62M 3/00* (2013.01); *B60L 53/00* (2019.02); *B62M 3/16* (2013.01); *B62M 6/40* (2013.01); *B62M 6/80* (2013.01); *B62M 6/90* (2013.01); *H01R 13/22* (2013.01); *H01R 13/6205* (2013.01); *H02J 7/0013* (2013.01); *H02J 7/0045* (2013.01); *B60L 2200/12* (2013.01); *B62J 45/411* (2020.02); *B62J 45/421* (2020.02); *H01R 2201/26* (2013.01)

(58) Field of Classification Search
None
See application file for complete search history.

(56) References Cited

U.S. PATENT DOCUMENTS

| 5,016,478 A | 5/1991 | Mercat |
| 5,027,303 A | 6/1991 | Witte |
| 5,319,522 A | 6/1994 | Mehta |
| 6,296,072 B1 * | 10/2001 | Turner .................. B62M 11/18 180/220 |

(Continued)

FOREIGN PATENT DOCUMENTS

| CN | 1724307 A | 1/2006 |
| CN | 101201284 A | 6/2008 |

(Continued)

OTHER PUBLICATIONS

Italian Search Report and Written Opinion in Italian Application No. 102018000005294, dated Jan. 15, 2019, with English translation.

(Continued)

Primary Examiner — Arun C Williams
(74) Attorney, Agent, or Firm — Volpe Koenig

(57) ABSTRACT

A bicycle crankarm has a rechargeable battery cell and a recharging port for the battery cell in a face of the crankarm body.

21 Claims, 4 Drawing Sheets

(56) References Cited

U.S. PATENT DOCUMENTS

| | | | |
|---|---|---|---|
| 6,321,734 | B1 | 11/2001 | Kaminaga et al. |
| 7,647,837 | B2 | 1/2010 | Moran et al. |
| 8,006,574 | B2 | 8/2011 | Meyer |
| 8,065,926 | B2 | 11/2011 | Meyer |
| 8,096,173 | B2 | 1/2012 | Isono |
| 8,800,389 | B2 | 8/2014 | Tetsuka |
| 8,852,130 | B2 | 10/2014 | Govari |
| 8,881,608 | B2 | 11/2014 | Tetsuka |
| 9,097,598 | B2 | 8/2015 | Grassi |
| 9,182,304 | B2 | 11/2015 | Namiki et al. |
| 9,221,440 | B2 | 12/2015 | Drennen |
| 9,254,588 | B1 | 2/2016 | Chao et al. |
| 9,310,264 | B2 | 4/2016 | David |
| 9,322,725 | B2 | 4/2016 | Tetsuka |
| 9,423,310 | B2 | 8/2016 | Tetsuka |
| 9,459,167 | B2 | 10/2016 | Heinkel et al. |
| 9,476,294 | B2 | 10/2016 | Harman |
| 9,488,668 | B2 | 11/2016 | Bailey et al. |
| 9,551,623 | B2 | 1/2017 | Beirmann |
| 9,581,508 | B2 | 2/2017 | Tetsuka |
| 9,599,526 | B2 | 3/2017 | Mercat |
| 9,784,628 | B1 | 10/2017 | Jennings et al. |
| 9,810,593 | B2 | 11/2017 | Carrasco |
| 9,829,402 | B2 | 11/2017 | Beason et al. |
| 9,969,451 | B2 | 5/2018 | Sasaki |
| 10,000,253 | B1 | 6/2018 | Tetsuka |
| 10,076,681 | B2 | 9/2018 | Lull |
| 10,286,978 | B1 | 5/2019 | Chen |
| 10,591,371 | B2 | 3/2020 | D'Elia |
| 2003/0093173 | A1 | 5/2003 | Farnworth et al. |
| 2003/0137046 | A1 | 7/2003 | Kageyama |
| 2005/0145061 | A1 | 7/2005 | Ording et al. |
| 2005/0199092 | A1 | 9/2005 | Feltrin et al. |
| 2007/0186719 | A1 | 8/2007 | Ciavatta et al. |
| 2007/0199403 | A1 | 8/2007 | Ciavatta et al. |
| 2008/0236293 | A1 | 10/2008 | Meggiolan |
| 2008/0257056 | A1 | 10/2008 | Smetana |
| 2008/0314193 | A1 | 12/2008 | Meggiolan |
| 2009/0119032 | A1 | 5/2009 | Meyer |
| 2009/0120210 | A1 | 5/2009 | Phillips et al. |
| 2010/0162830 | A1 | 7/2010 | Meuter |
| 2010/0220963 | A1 | 9/2010 | Tamura et al. |
| 2010/0242273 | A1 | 9/2010 | Sugimoto et al. |
| 2010/0263468 | A1 | 10/2010 | Fisher et al. |
| 2011/0135474 | A1 | 6/2011 | Thulke |
| 2012/0169154 | A1 | 7/2012 | Curodeau |
| 2012/0214646 | A1 | 8/2012 | Lull et al. |
| 2012/0330572 | A1 | 12/2012 | Longman |
| 2013/0205916 | A1 | 8/2013 | Kodama et al. |
| 2013/0283969 | A1 | 10/2013 | Watarai |
| 2013/0333489 | A1 | 12/2013 | David et al. |
| 2014/0060212 | A1 | 3/2014 | Tetsuka et al. |
| 2014/0200835 | A1 | 7/2014 | Carrasco Vergara |
| 2015/0239499 | A1 | 8/2015 | Lan et al. |
| 2015/0247767 | A1 | 9/2015 | Tetsuka |
| 2016/0003696 | A1 | 1/2016 | Longman et al. |
| 2016/0031523 | A1 | 2/2016 | Tetsuka et al. |
| 2016/0052583 | A1* | 2/2016 | Sasaki ............... G01L 5/13 74/594.4 |
| 2016/0295702 | A1 | 10/2016 | Heikkinen et al. |
| 2016/0311491 | A1 | 10/2016 | Watarai |
| 2017/0127581 | A1 | 5/2017 | Figueredo et al. |
| 2017/0176275 | A1 | 6/2017 | Tetsuka et al. |
| 2017/0232674 | A1 | 8/2017 | Mark |
| 2017/0247078 | A1* | 8/2017 | Tetsuka ............... B62M 3/00 |
| 2017/0248420 | A1 | 8/2017 | Fyfe et al. |
| 2017/0271722 | A1 | 9/2017 | Ehm et al. |
| 2017/0356816 | A1 | 12/2017 | D'Elia et al. |
| 2018/0011122 | A1 | 1/2018 | Nichols et al. |
| 2018/0290714 | A1 | 10/2018 | Fossato et al. |
| 2019/0099119 | A1 | 4/2019 | Wakeham |

FOREIGN PATENT DOCUMENTS

| | | |
|---|---|---|
| CN | 101290026 A | 10/2008 |
| CN | 101327828 A | 12/2008 |
| CN | 201201674 Y | 3/2009 |
| CN | 201707167 U | 1/2011 |
| CN | 102589772 A | 7/2012 |
| CN | 103612702 A | 3/2014 |
| CN | 103674384 A | 3/2014 |
| CN | 204527067 U | 8/2015 |
| CN | 205156906 U | 4/2016 |
| CN | 106003753 A | 10/2016 |
| CN | 106335591 A | 1/2017 |
| CN | 106965901 A | 7/2017 |
| CN | 107290086 A | 10/2017 |
| CN | 107585252 A | 1/2018 |
| CN | 207019821 U | 2/2018 |
| EP | 1 486 413 A2 | 12/2004 |
| EP | 1 818 252 A1 | 8/2007 |
| EP | 1 978 342 A2 | 10/2008 |
| EP | 1 407 239 B1 | 1/2009 |
| EP | 2 058 637 A2 | 5/2009 |
| EP | 2805141 B1 | 11/2014 |
| JP | H08145824 A | 6/1996 |
| TW | 201307145 A | 2/2013 |
| WO | 2011/030215 A1 | 3/2011 |
| WO | 2014009381 A1 | 1/2014 |
| WO | 2015/095933 A1 | 7/2015 |
| WO | 2016/030859 A1 | 3/2016 |
| WO | 2017/165448 A1 | 9/2017 |

OTHER PUBLICATIONS

Italian Search Report and Written Opinion in Italian Application No. 102018000005297, dated Mar. 4, 2019, with English translation.
Italian Search Report and Written Opinion in Italian Application No. 102018000005299, dated Jan. 21, 2019, with English translation.
Italian Search Report and Written Opinion in Italian Application No. 102018000005302, dated Jan. 23, 2019, with English translation.
Italian Search Report and Written Opinion in Italian Application No. 102018000007266, dated Mar. 22, 2019, with English translation.
Ron/Spinningmagnets; "Electric bicycles are adopting a new standard for connectors: electricbike.com"; published on Dec. 6, 2013. Retrieved from the Internet: URL: https://www.electricbike.com/ropdenergybus-charging-port-standard/ (accessed on May 3, 2019).
Chinese Office Action for Application No. 201910389220.0, dated Aug. 11, 2021, with English translation.
Chinese Office Action for Application No. 201910388132.9, dated Aug. 17, 2021, with English translation.
Chinese Office Acton for Application No. 201910388492.9, dated Jan. 12, 2022. English translation attached.
Chinese Office Acton for Application No. 201910389220.0, dated Jan. 21, 2022. English translation attached.
Chinese Office Action for Chinese Application No. 201910388132.9, dated Mar. 28, 2022. English translation attached.

* cited by examiner

BICYCLE CRANKARM AND RELATED CRANKSET

CROSS REFERENCE TO RELATED APPLICATION

This application claims the benefit of Italian Application No. 102018000005297, filed on May 11, 2018, which is incorporated herein by reference as if fully set forth.

FIELD OF INVENTION

The invention relates in general to the field of bicycles. More particularly, as bicycles are increasingly equipped with electrical/electronic systems, the battery power supply units that supply the system can be replaceable; however, it is more advantageous and practical to provide for battery power supply units that are rechargeable on-board.

BACKGROUND

EP1978342A2 discloses an instrument-equipped bicycle component comprising a detection unit of at least one parameter representative of a stress imparted upon said component. In particular a crankset—therein called bottom bracket assembly—and a detection unit associated with the bottom bracket shaft are described. The detection unit is supplied by a battery housed in a cavity of the bottom bracket shaft. The battery can be rechargeable, for example by induction. The recharging of the battery takes place by means of a suitable battery charger that is inserted in a seat made on the battery.

US2017/0247078A1 discloses an electrical unit for a bicycle crankset, the bicycle electrical unit comprising a housing configured to be mounted on a crankarm and a recharging port provided on the housing, in particular of the USB type. Electronic components of the electrical unit are supplied by a battery power supply unit housed in the same housing or inside the bottom bracket spindle. The housing is mounted on a sprocket mounting portion of the crankarm, in particular radially—with reference to the rotation axis of the crankarm—between two adjacent sprocket mounting arms, through projecting attachment parts inserted in corresponding recesses made on the two sprocket mounting arms; on the bottom of such recesses or close thereto a passage hole for electrical cables is made; the housing is then screwed to the crankarm. The housing has a curved outer profile, so that when it is mounted it is arranged circumferentially between two sprocket mounting arms. The solution described in the document is therefore only applicable to the crankarm on the transmission side.

The Applicant observes that the housing of this document projects with respect to the spider legs between which it is mounted, unbalancing the crankarm in terms of aerodynamics and appearance. Moreover, the housing is arranged between the spider and the chainrings, therefore requiring the dismounting of the latter, and not being suitable for chainrings made as one piece with the crankarm. Furthermore, given the attachment means and the location of the holes for the electrical cables, this solution is not proper for a crankarm made of composite material comprising structural fiber incorporated in a polymeric matrix. Moreover, the recharging port turns out to be in a position that is hard to reach for the insertion of the recharging cable, and that can be dangerous for the fingers; at the same time the recharging port is particularly exposed to the chain grease.

The technical problem at the basis of the invention is to provide an alternative solution to those known for recharging a battery power supply unit.

SUMMARY

The present solution provides a bicycle crankarm having a rechargeable battery cell in a body of the crankarm and a recharging port for the battery cell in a face of the crankarm body.

BRIEF DESCRIPTION OF THE DRAWINGS

Further features and advantages of the invention will be more clearly apparent from the description of preferred embodiments thereof, made with reference to the attached drawings, wherein.

DETAILED DESCRIPTION OF THE PREFERRED EMBODIMENTS

Figure 1:
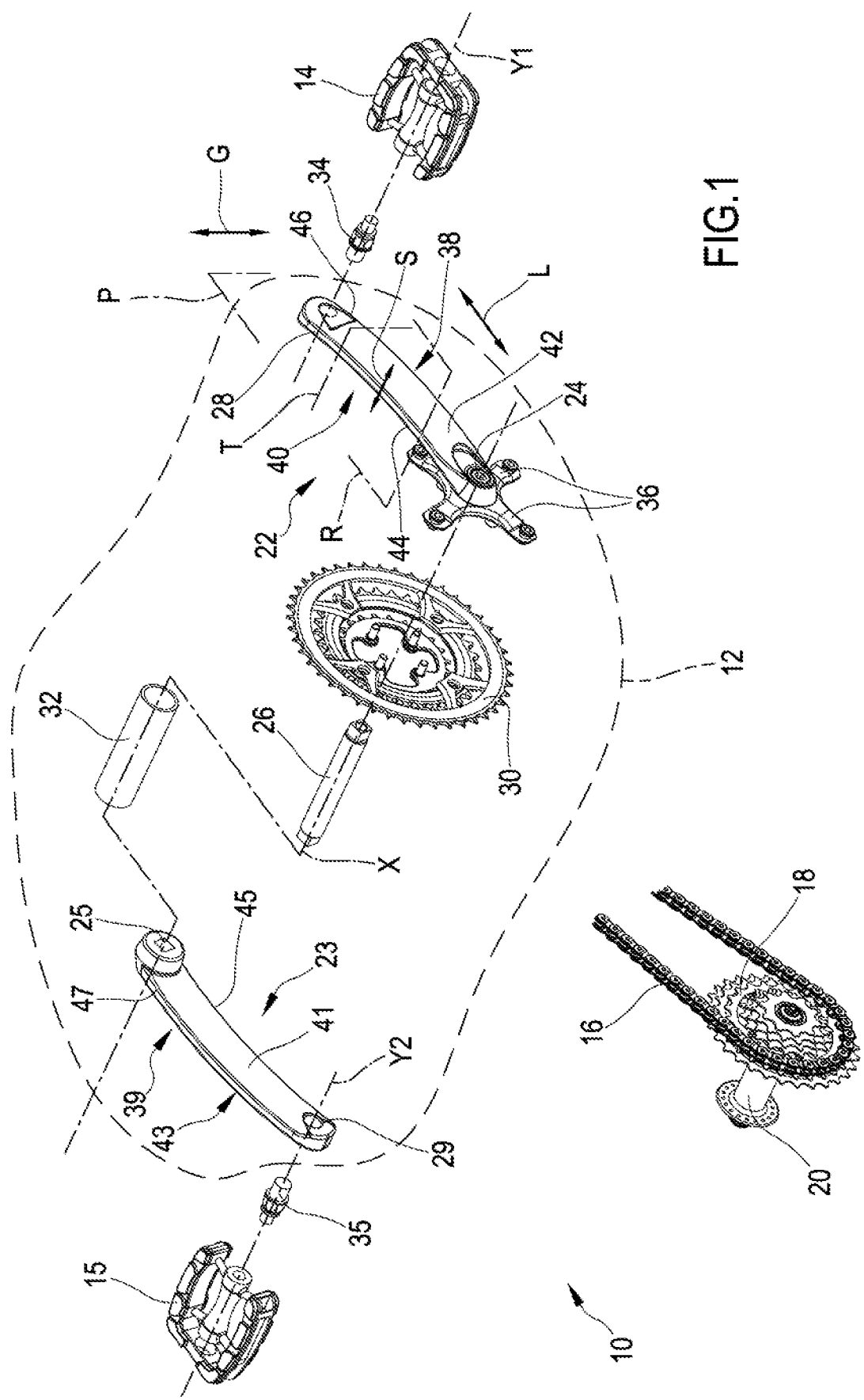
FIG. 1 schematically illustrates a bicycle transmission.

For the sake of brevity the expression "on the transmission side" hereinafter will sometimes be simplified by the specific term "on the chain side" and sometimes further simplified by the specific term "right", a belt transmission and also a left crankarm in the case of atypical mounting of the transmission being anyway meant to be encompassed. Similarly, the expression "on the side opposite to the transmission side" will sometimes be simplified to "on the side opposite to the chain side" and sometimes further simplified by the specific term "left", a belt transmission and also a right crankarm in the case of atypical mounting of the transmission being anyway meant to be encompassed.

In one aspect, the invention relates to a crankarm comprising a main body, or arm region, extending between a rotation axis and a pedal axis of the crankarm, comprising a recharging port for a battery power supply unit, characterized in that said recharging port is made at a face of the main body.

In this way the aforementioned drawbacks of the prior art are overcome, and advantageously the recharging port made on the crankarm is easier to reach, further away from the bottom bracket spindle and/or from the transmission chain and therefore less exposed to dirt and lubricant, hampering to a less extent possible operations on the spindle or on the chain.

Preferably, the crankarm comprises a plurality of spider legs (wholly indicated as spider) that extend radially, at a pivot end of the crankarm, about the rotation axis.

Preferably, the recharging port is substantially flush with the rest of the outer surface of the main body of the crankarm.

In the present description and in the attached claims, under outer surface of the crankarm, the exposed surface thereof is meant to be indicated.

In this way, advantageously the recharging port substantially does not project from the main body, giving a good result in terms of aerodynamics and appearance, and is more protected from impacts.

Preferably, said battery power supply unit is supported by the crankarm itself.

In this way, the connection cables between the battery power supply unit and the recharging port follow a path of minimum length, and problems of connection between components that are physically separable from one another or even in reciprocal motion are avoided.

Preferably, in this case, the battery power supply unit is housed in a cavity inside the crankarm.

In this way, an advantageous saving of space is achieved, as well as advantages in terms of appearance and aerodynamics of the crankarm.

Preferably, in this case, the cavity is closed by a cover, more preferably by a watertight cover.

Even more preferably, the cover is glued along its edge to the crankarm.

Preferably, in this case, the recharging port is made at the cover.

Alternatively, the battery power supply unit is fixed on an outer surface of the crankarm.

Such a configuration, although being less advantageous in terms of appearance and aerodynamics, is more advantageous in the case of replacement of the battery power supply unit, for example in the case of failures.

Preferably, the recharging port is made at a proximal face of the main body.

In the present description and in the attached claims, under proximal face of the crankarm, the face that, in the mounted condition, faces the frame is meant to be indicated; under distal face of the crankarm, the face opposite the proximal face is meant to be indicated.

In this way, the recharging port is less visible from the outside of the bicycle, with the result of a better appearance of the crankarm and of the bicycle as a whole; moreover, it is not subject to friction with the foot of the cyclist.

Alternatively, the battery power supply unit is supported by another component of the crankset.

Preferably, in this case the battery power supply unit is housed in the other crankarm or in a cavity of the bottom bracket spindle.

If the battery power supply unit is housed in a cavity of the bottom bracket spindle, the battery power supply unit can be more easily used to supply electrical/electronic components on both of the crankarms. Moreover, a space that is otherwise unused, inside the bottom bracket spindle, is advantageously exploited.

In any case, irrespective of where the battery power supply unit is positioned, the latter can power one or more electrical/electronic components coupled with the crankarm itself, in particular housed on or in the crankarm itself, or coupled with other components of the bicycle transmission.

Preferably, the recharging port comprises two electrical contacts for connection with a recharging device comprising two matched contacts, which in their turn are powered by an external source, wherein the contacts of the recharging port are of the flush type and wherein there is provided for: (i) at least one magnet, preferably a pair of magnets, at the recharging port for magnetic matching with a corresponding magnet(s) or metallic element(s) of the recharging device, or (ii) at least one metallic element, preferably a pair of metallic elements, at the recharging port for magnetic matching with at least one magnet, preferably a pair of magnets, of the recharging device.

The external source can be the mains, in which case the recharging device comprises a plug, or a hardware component, in which case the recharging device comprises a suitable connector, in particular a USB or miniUSB connector.

Preferably, the recharging port comprises a pair of reversible contacts, namely recharging can take place irrespective of the orientation of the two contacts of the recharging device with respect to the two contacts of the recharging port.

Preferably, the battery power supply unit comprises one or more button cells.

Preferably the crankarm is made at least in part of composite material comprising structural fiber incorporated in a polymeric matrix.

Preferably the structural fiber is selected from the group consisting of carbon fibers, glass fibers, boron fibers, synthetic fibers, ceramic fibers and combinations thereof.

Preferably, the synthetic fibers comprise polyoxazole fibers, for example Zylon®, ultra high molecular weight polyethylene fibers, for example Dyneema®, aramid fibers, for example kevlar fibers and combinations thereof.

In another aspect, the invention relates to a bicycle crankset comprising a first crankarm, in particular on the transmission side, and a second crankarm, in particular on the side opposite to the transmission side, each of said crankarms comprising a main body extending between a rotation axis and a pedal axis, said first crankarm comprising a first recharging port for a battery power supply unit, characterized in that said first recharging port is made at a face of the main body of said first crankarm.

Preferably, the crankset comprises a first and a second battery power supply unit, and a second recharging port for a battery power supply unit, wherein said second recharging port is made at a face of the main body of said second crankarm, and wherein said first and second battery power supply units are supported by said first and by said second crankarm, respectively, and are connected to said first and to said second recharging port, respectively.

Alternatively, said crankset comprises a battery power supply unit and a second recharging port, made at a face of the main body of said second crankarm, said battery power supply unit being connected to said first and to said second recharging ports.

Further alternatively, said crankset comprises a first and a second battery power supply unit, wherein said first and second battery power supply units are supported by said first and by said second crankarm, respectively, said first recharging port being connected to said first and to said second battery power supply units.

In another aspect, the invention relates to a crankset comprising a crankarm on the transmission side and a crankarm on the side opposite to the transmission side, each of said crankarms comprising a main body extending between a rotation axis and a pedal axis, said crankset comprising a battery power supply unit, and a recharging port of said battery power supply unit, said recharging port being supported by a predetermined one of the two crankarms, characterized in that the recharging port is made at a face of the respective main body.

Preferably, said battery power supply unit is supported by one of the crankarm on the transmission side and the crankarm on the side opposite to the transmission side, preferably by said predetermined crankarm.

Preferably, said crankset further comprises a bottom bracket spindle, said battery power supply unit being supported by one of the bottom bracket spindle, the crankarm on the transmission side, and the crankarm on the side opposite to the transmission side, preferably by said predetermined crankarm.

Preferably, said crankset comprises a second battery power supply unit and a second recharging port of said second battery power supply unit, said second recharging port being supported by the other one of the two crankarms with respect to the predetermined crankarm, being made at a face of the respective main body.

Preferably, said second battery power supply unit is supported by the other crankarm.

Preferably, said crankset comprises a bottom bracket spindle, said second battery power supply unit being supported by one of the bottom bracket spindle, the crankarm on the transmission side, and the crankarm on the side opposite to the transmission side, preferably by said predetermined crankarm.

Preferably, said crankset comprises a bottom bracket spindle and a third battery power supply unit, the first battery power supply unit being supported by the crankarm on the transmission side, the second battery power supply unit being supported by the crankarm on the side opposite to the transmission side, and the third battery power supply unit being supported by the bottom bracket spindle.

With reference now to FIG. 1, a bicycle transmission is now described.

A bicycle transmission 10 is a mechanism that converts the motion applied by the cyclist into rotary motion used to move the rear wheel. A crankset 12 is the component of the transmission 10 of a bicycle that converts the motion applied to the pedals 14, 15 by the cyclist into rotary motion used to move the transmission chain 16 (in other cases, the belt), which in turn moves the rear wheel.

Besides the crankset 12, the transmission 10 further comprises the pedals 14, 15, the aforementioned chain 16 (or belt), and one or more sprockets 18 at the hub 20 of the rear wheel.

It should be emphasized that slightly different terminology from that used here is also in use; for example the pedals 14, 15 can be considered part of the crankset.

The crankset 12 comprises in general two crankarms 22, 23, each having a pivot end 24, 25 configured for coupling with a bottom bracket spindle 26 or axle of the crankarms 22, 23, and a free end 28, 29, opposite the pivot end 24, 25, configured for coupling with the pedal 14, 15; as well as at least one chainring 30 (three being shown as an example) fixed to the crankarm 22 on the chain side, integrally rotating (rotating as a unit) therewith.

Typically, the motion transmission 10 is mounted on the bicycle with the transmission chain 16 (and the chainring(s) 30 of the crankset 12 and the sprocket(s) 18 at the hub 20 of the rear wheel) on the right side; less often it is mounted with transmission chain 16, chainring(s) 30 and sprocket(s) 18 arranged on the left side of the bicycle.

A component called bottom bracket 32 allows the rotation of the bottom bracket spindle 26 itself with respect to the bicycle frame in at least one direction; namely, the bottom bracket 32 forms the connection element of the crankset 12 to the frame.

The axis of the bottom bracket spindle 26 is also indicated hereinafter as rotation axis X, and is horizontal in the normal travel condition of the bicycle, in levelled rectilinear motion.

In the bottom bracket 32, the spindle 26 is rotationally supported about the rotation axis X through suitable bearings.

For the connection of each pedal 14, 15 to the respective crankarm 22, 23, suitable pivotal connection means are provided that allow the pedal 14, 15 to freely rotate around an axis called pedal axis Y1, Y2 herein, which in turn rotates about the rotation axis X with the crankarm 22, 23.

The connection between crankarm 22, 23 and respective pedal 14, 15 is typically of the pin/hole type or of another type that preferably allows the rotation of the pedal 14, 15 around the axis Y1, Y2 with respect to the crankarm 22, 23. The pedal pivot 34, 35 can be fixedly connected to the free end 28, 29 of the crankarm 22, 23 and the hole can be made in the pedal 14, 15. Alternatively, the pedal pivot 34, 35 can be fixedly connected to the pedal 14, 15 and the hole can be made at the free end 28, 29 of the crankarm 22, 23. As a further alternative, it is possible to provide for two holes, at the free end 28, 29 of the crankarm 22, 23 and on the pedal 14, 15, suitable for receiving a bolt or a screw.

The connection between crankarm 22, 23 and a respective axially outer end of the bottom bracket spindle 26 is of a type that makes them integrally rotate (rotate as a unit), and prevents the axial sliding of the crankarms 22, 23 with respect to the spindle 26.

A crankarm 22, 23 can be made as a single piece with the spindle 26, the other crankarm 23, 22 being coupled to the other end of the spindle 26 after the insertion of the latter in the bottom bracket 32. Alternatively, each crankarm 22, 23 can be made as a single piece with a respective spindle element, the two spindle elements being connected to one another end-to-end. As a further alternative, both crankarms 22, 23 can be coupled to a spindle 26 not in one piece.

For one or both of the crankarms 22, 23 there can for example be a screw matching, a force fitting, in particular through splined fitting, a square pin and hole matching, a gluing, or a welding.

The (typically right) crankarm 22 on the chain side 16 comprises means for fixing said chainrings 30 intended to engage, one at a time, with the chain 16. Typically, a plurality of spider legs 36 are provided for (indicated as a whole as spider), that extend radially, at the pivot end 24 of the right crankarm 22, typically as one piece with the crankarm 22; at the free ends of the spider legs 36, the chainring(s) 30 is(are) typically screwed in. Alternatively, the chainrings 30 can be made as a single piece with the right crankarm 22.

The main body or "arm region" 38, 39 of each crankarm 22, 23, namely a portion thereof extending between the rotation axis X and the pedal axis Y1, Y2 and therefore disregarding the aforementioned spider 36, is generically shaped like a bar (or rectangular parallelepiped) extending orthogonal (and cantilevered) to the rotation axis X. For the sake of brevity, hereinafter the expression "crankarm" will sometimes be used, meaning in particular the bar-shaped main body 38, 39 thereof.

More in particular, the main body 38, 39 of the crankarm 22, 23 extends in a generically radial direction with respect to the rotation axis X—under generically it being meant that it can also deviate, in one or more points as well as along the entire extension thereof, from such a direction. Each crankarm 22, 23 can indeed be more or less tapered/countersunk, when seen along a direction parallel to the rotation axis X, and/or more or less angled when seen along a direction orthogonal to the rotation axis X.

In the present description and in the attached claims, under rotation plane P of the crankarm 22, 23, any plane orthogonal to the pedal axis Y1, Y2 and to the rotation axis X is meant to be indicated, in particular one of the median planes of the crankarm 22, 23.

In the present description and in the attached claims, under rotary plane R of the crankarm 22, 23 or axes plane, the plane containing the rotation axis X and the pedal axis Y1, Y2 is meant to be indicated. In particular, under rotary plane R, one of the median planes of the crankarm 22, 23 is meant to be indicated.

With reference to such a schematization of the crankarm 22, 23 as a bar, in the present description and in the attached claims, under length direction L of the crankarm 22, 23, a direction orthogonally joining the rotation axis X to the pedal axis Y1, Y2 is meant to be indicated; the length direction L lies in particular in the rotary plane R.

In the present description and in the attached claims, under transversal plane T to the crankarm 22, 23, any plane orthogonal to the length direction L is meant to be indicated. In particular, under transversal plane T, one of the median planes of the crankarm 22, 23 is meant to be indicated.

In the present description and in the attached claims, under cross section of the crankarm 22, 23, a section taken through the main body 38, 39 of the crankarm 22, 23 in a transversal plane T is meant to be indicated. The cross section of each crankarm 22, 23 (in the arm region 38 for the right crankarm 22) is generically rectangular, but it can be of any type, although it typically has at least one axis of symmetry. The shape and size of such a cross section can be constant along the entire length of the crankarm 22, 23 or they can change. The cross section of each crankarm 22, 23 can be solid or hollow.

In the present description and in the attached claims, under width direction G of the crankarm 22, 23, a direction lying in the rotation plane P and orthogonal to the length direction L of the crankarm 22, 23 is meant to be indicated; the width direction G lies in a transversal plane T.

In the present description and in the attached claims, under thickness direction S of the crankarm 22, 23, a direction parallel to the rotation axis X is meant to be indicated; the thickness direction S lies in a transversal plane T and in the rotation plane R.

For the sake of clarity, in FIG. 1 these planes and these directions are only shown on the right crankarm 22.

The bottom bracket spindle 26 extends from the proximal face 40, 41, and the pedal pivot 34, 35 extends from the distal face 42, 43.

In the present description and in the attached claims, under upper face 44, 45 and lower face 46, 47, respectively, of the crankarm 22, 23, the faces substantially orthogonal to the proximal face 40, 41 and to the distal face 42, 43 are meant to be indicated, extending along the length direction L and the thickness direction S, which are located in upper and lower position, respectively, when the crankarm 22, 23 is in the downstroke, namely with the free end 28, 29 forwards in the travel direction with respect to the pivot end 24, 25.

The crankset 12 is equipped with an electrical/electronic system. The electrical/electronic system is in particular a detection system of the stresses/strains in at least one component of the crankset. The detection system can advantageously be used in a torque meter or in a power meter. A torque meter is an instrument for detecting the torque delivered by the cyclist; a power meter is an instrument for detecting pedaling power.

Alternatively to the power meter or torque meter, the electrical/electronic system with which the crankset is provided can be of any other type, for example a cadence, speed, position, height or altitude measuring device.

Such an electrical/electronic system comprises one or more battery power sources.

Figure 2:
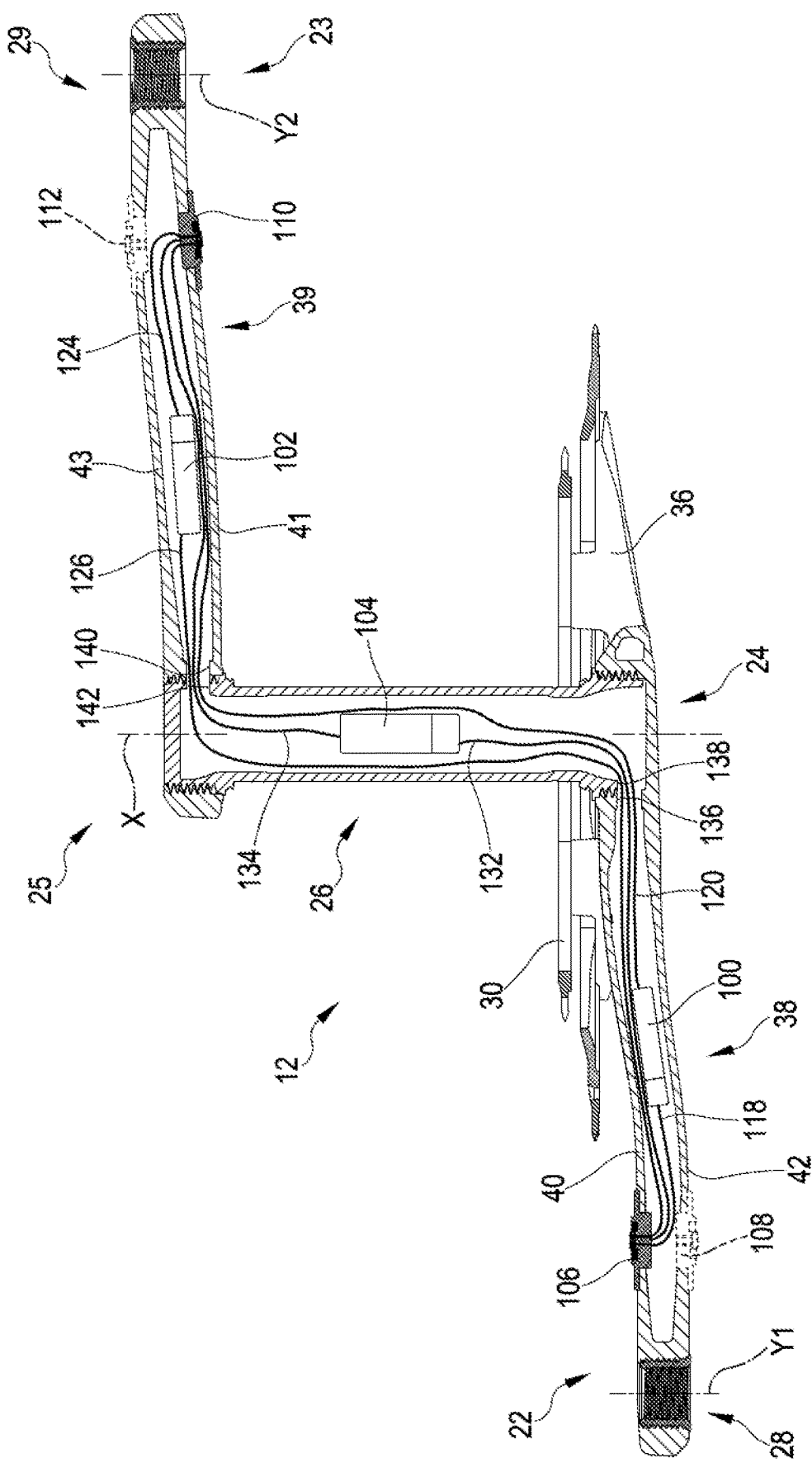
FIG. 2 illustrates a section through a part of a crankset and possible alternative locations of some components thereof.

FIG. 2 schematically shows some possible locations, in the crankset 12, of battery power supply units 100, 102, 104 and recharging ports 106, 108, 110, 112 for the aforementioned battery power supply units 100, 102, 104. In an electrical/electronic system there are preferably up to three battery power supply units 100, 102, 104, and one or two recharging ports 106, 108, 110, 112 on one or both of the crankarms 22, 23.

The electrical/electronic system supplied by the battery power supply unit(s) 100, 102, 104 is not shown specifically, since it could, as stated, be an electrical/electronic system of any type and having any purpose, or even plural electrical/electronic systems, the electrical/electronic components of which can be housed in a crankarm 22, 23, or distributed (also) on other components of the crankset or more in general of the transmission.

The battery power supply unit 100 is associated with, preferably attached to, or even more preferably inserted in an inner cavity of, the crankarm 22 on the chain side.

The battery power supply unit 102 is associated with, preferably attached to, or even more preferably inserted in an inner cavity of, the crankarm 23 on the side opposite to the chain side.

The battery power supply unit 104 is associated with, preferably attached to, or even more preferably inserted in an inner cavity of, the bottom bracket spindle 26.

The recharging ports 106, 108 and 110, 112 are made at a face of the main body 38, 39 of each crankarm 22, 23. More in particular, the recharging ports 106 and 110 are made at the proximal face 40, 41 of the respective crankarm 22, 23, while the recharging ports 108 and 112 are made at the distal face 42, 43 of the respective crankarm 22, 23. In a practical embodiment, there will typically be at most a single recharging port for each crankarm 22, 23. Preferably, there will be at most both of the recharging ports 106, 110 on the proximal side, and reference will only be made to these in the rest of the description for the sake of brevity.

The battery power supply unit 100, if provided for, is rechargeable in a preferred manner through the recharging port 106, through a preferred path of recharging cables 118. Alternatively, the battery power supply unit 100 can also be charged through the recharging port 110 through the path of recharging cables 120.

In an analogous manner, the battery power supply unit 102, if provided for, is rechargeable in a preferred manner through the recharging port 110, through the preferred path of recharging cables 124, but it can also be recharged through the recharging port 106 through the path of recharging cables 126.

The battery power supply unit 104, if provided for, can be recharged through the recharging port 106 through the path of recharging cables 132 or through the recharging port 110 through the path of recharging cables 134.

The recharging cables 120, 126, 132, if provided for, pass through coaxial holes 136, 138 made between the crankarm 22 on the chain side and the bottom bracket spindle 26.

The recharging cables 120, 126, 134, if provided for, pass through coaxial holes 140, 142 made between the crankarm 23 on the side opposite to the chain side and the bottom bracket spindle 26.

It is clear that in a specific embodiment, each battery power supply unit 100, 102, 104, if provided for, may have a single recharging cable 118, 120; 124, 126; 132, 134 extending therefrom, directed to a single respective one among the recharging ports 106, 110. Each battery power supply unit 100, 102, 104, if provided for, can however also be connected to both recharging ports 106, 110.

Conversely, it is also clear that, in a specific embodiment, each recharging port 106, 110 may have a single recharging cable 118, 126, 132; 120, 124, 134 extending therefrom, directed to a single respective one of the battery power supply units 100, 102, 104. Each recharging port 106, 110 can however also be connected to more than one battery power supply unit 100, 102, 104.

Preferably, the electrical/electronic components of the system supplied by a battery power supply unit 100, 102, 104 are coupled with, preferably attached to, and more preferably housed in, the same component of the respective battery power supply unit 100, 102, 104.

Figure 3:
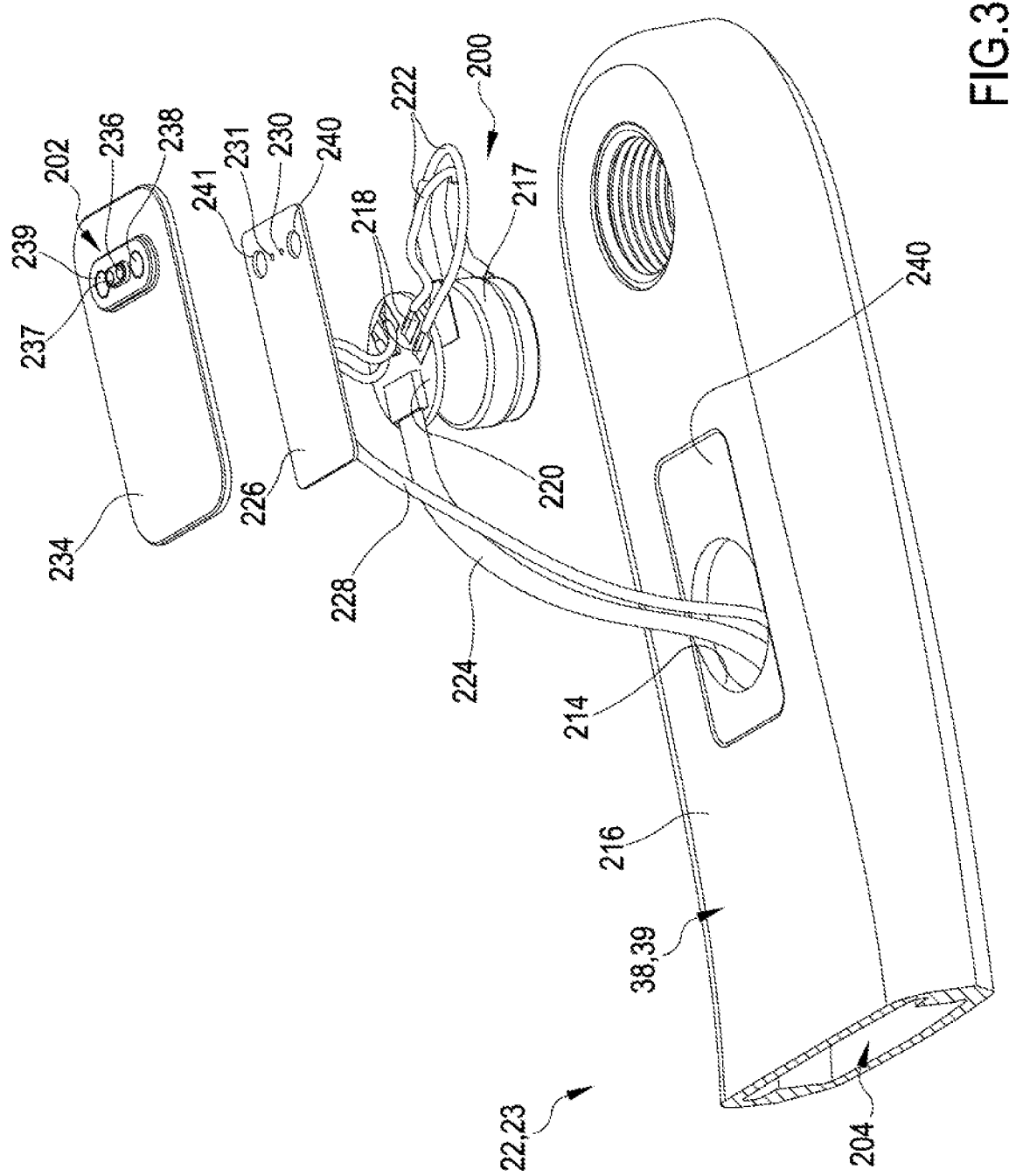
FIGS. 3 and 4 show a portion of a crankarm according to a preferred embodiment of the invention, with components in an exploded view.
Figure 4:
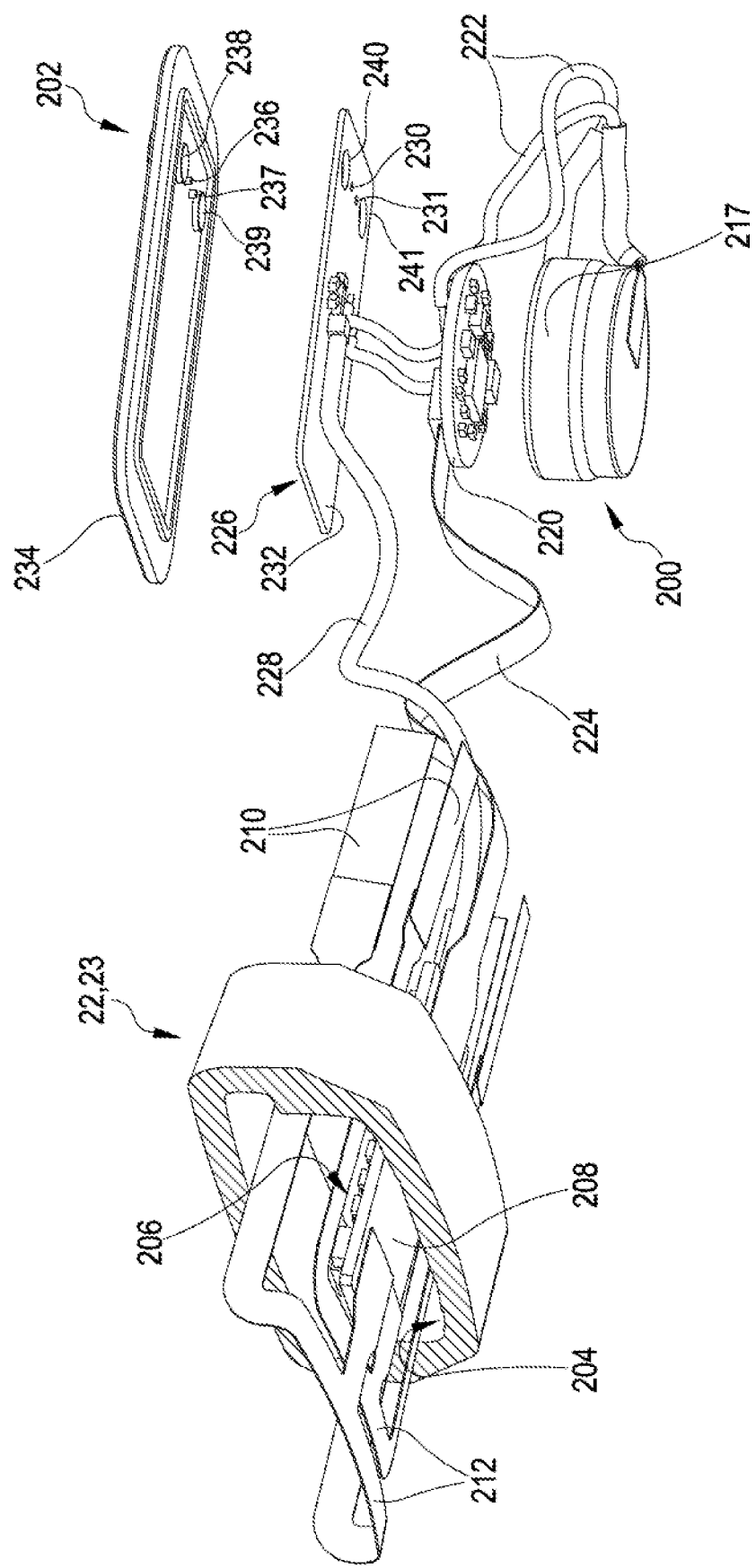

FIGS. 3 and 4 illustrate a preferred embodiment of a battery power supply unit 200 with related recharging port 202, both supported by a crankarm 22, 23, shown in part.

The battery power supply unit 200 thus represents one of the battery power supply units 100 and 102 of FIG. 2, and the recharging port 202 represents one of the recharging ports 106 and 110 (or 108, 112) of FIG. 2.

The crankarm 22, 23 comprises a cavity 204 extending for a certain length of its main body 38, 39.

A hollow crankarm like the one shown is manufactured, in a composite material comprising structural fiber, for example through the process described in document EP1818252A1, herein incorporated by reference.

In the case shown, first the cavity 204 houses electrical/electronic components 206 part of an electronic system, implementing for example a power meter as stated above. Merely by way of an example, in FIG. 4 it is possible to see a first printed circuit board 208 or PCB, sensors 210, specifically of the strain gage type or temperature sensors, and flexible circuits 212 for connection between the PCB 208 and the sensors 210. On the printed circuit board or PCB 208 there can in particular be a processor (MCU—Micro Controller Unit).

The battery power supply unit 200 is inserted in the cavity 204 of the crankarm 22, 23 at the end of manufacturing, through a suitable hole 214, made on the proximal face 216 of the crankarm, 22, 23.

In an alternative embodiment (not shown), the battery power supply unit 200 can be fixed on an outer surface, in particular again at the proximal face 216, of the crankarm 22, 23.

The battery power supply unit 200 comprises a button cell 217 of the rechargeable type, or two cells connected in series.

The battery power supply unit 200 shown is of the smart type. The positive and negative poles of the cell 217 are connected to respective contacts 218 of a second printed circuit board 220 through respective cables 222. The second printed circuit board 220 is connected to the first printed circuit board 208 through a flexible circuit 224. The cables 222, the flexible circuit 224 and the second printed circuit board 220 are also inserted in the cavity 204.

The second printed circuit board 220 carries a circuit intended for the management of the battery power supply unit 200, comprising in a per se known manner for example a voltage regulator, a protection circuit to avoid over/undercurrents, -voltages or -temperatures at the cell 217, optionally a Coulomb counter to take the residual charge of the cell 217 into account.

A third printed circuit board 226 carries a charge circuit that receives a charge voltage from mains or from a source external to the supplied electronic component. In the case of a battery power supply unit 200 not of the smart type, the second printed circuit board 220 or the third printed circuit board 226 could be absent.

The third printed circuit board 226 is connected to the first printed circuit board 208 through a cable 228.

The third printed circuit board 226 carries contacts 230, 231 on a face 232 thereof facing the hole 214 of the crankarm 22, 23.

A cover 234 carries two contacts 236, 237 that match with the contacts 230, 231, respectively, to form the recharging port 202.

The charge circuit on the third printed circuit board 226, or directly the cell 217 if the third printed circuit board 226 is absent, receives the recharging current from the recharging port 202.

A recharging device (not shown) comprises a second recharging port comprising two matched contacts, in turn supplied by an external source.

The external source can be the mains, in which case the recharging device comprises a plug, or a hardware component, in which case the recharging device comprises a suitable connector, in particular a USB or miniUSB connector.

Advantageously, the contacts 236, 237 of the recharging port 202 are of the flush type and there is at least one magnet, preferably a pair of magnets 238, 239 as shown, at the recharging port 202 for magnetic matching with a corresponding magnet(s) or metallic element(s) of the second recharging port of the recharging device.

Holes 240, 241 can be provided in the third printed circuit board 226 to receive the magnets 238, 239.

Alternatively, there can be at least one metallic element, preferably a pair of metallic elements, at the recharging port 202 for magnetic matching with at least one magnet, preferably a pair of magnets of the second recharging port of the recharging device.

Preferably, the contacts 236, 237 of the recharging port 202 are reversible contacts, namely the recharging can take place irrespective of the orientation of the two contacts of the recharging port of the recharging device with respect to the two contacts 236, 237 of the recharging port 202.

Preferably, the cover 234 closes the cavity 204 hermetically, in a tight manner. For example, the cover 234 is glued or possibly welded along its edge to plug the cavity 204, preferably being received in a recessed seat 240 at the hole 214, so as to be substantially flush with the rest of the outer surface of the crankarm 22, 23, in particular of the proximal face 216 of the main body 38, 39 of the crankarm 22, 23.

Therefore, the recharging port 202 is also substantially flush with the rest of the outer surface of the crankarm 22, 23.

Although the invention has been described in detail with reference to a crankarm made of composite material, the invention can also be applied to a crankarm made of metallic material.

The distribution of the various component on plural printed circuit boards shown is not essential, it being possible to provide for a single printed circuit board or a number of printed circuit boards greater than three.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle crankarm comprising a main body extending between a rotation axis (X) and a pedal axis of the crankarm, and having a recharging port for a battery power supply unit, wherein said recharging port is on a face of the main body of the crankarm.

2. The crankarm according to claim 1, comprising a plurality of spider legs that extend radially at a pivot end about the rotation axis (X).

3. The crankarm according claim 1, wherein said battery power supply unit is supported by the crankarm itself.

4. The crankarm according to claim 3, wherein the battery power supply unit is housed in a cavity inside the crankarm.

5. The crankarm according to claim 4, wherein the cavity is closed by a cover.

6. The crankarm according to claim 5, wherein the recharging port is on the cover.

7. The crankarm according to claim 1, wherein the recharging port is on a proximal face of the main body.

8. The crankarm according to claim 1, wherein the battery power supply unit is supported by another component of a crankset.

9. The crankarm according to claim 1, wherein the battery power supply unit powers at least one electrical/electronic component coupled with the crankarm itself.

10. The crankarm according to claim 1, wherein the recharging port comprises two electrical contacts for connection with a recharging device comprising two matched contacts which are powered by an external source, wherein the two electrical contacts of the recharging port are of the flush type, and at least one magnet is provided at the recharging port for magnetic matching with a corresponding magnet or metallic element of the recharging device.

11. The crankarm according to claim 10, wherein the two electrical contacts are reversible contacts.

12. A bicycle crankset comprising a first crankarm and a second crankarm, each of said crankarms comprising a main body extending between a rotation axis (X) and a pedal axis, said first crankarm comprising a first recharging port for a battery power supply unit, wherein said first recharging port is on a face of the main body of said first crankarm.

13. The crankset according to claim 12, further comprising a second battery power supply unit, and a second recharging port, wherein said second recharging port is on a face of the main body of said second crankarm, and wherein said first and second battery power supply units are supported by said first crankarm and said second crankarm, respectively, and are connected to said first recharging port and said second recharging port, respectively.

14. The crankset according to claim 12, further comprising a battery power supply unit and a second recharging port, on a face of the main body of said second crankarm, said battery power supply unit being connected to said first and said second recharging ports.

15. The crankset according to claim 12 further comprising a first battery power supply unit and a second battery power supply unit, wherein said first and second battery power supply units are supported by said first crankarm and said second crankarm, respectively, said first recharging port being connected to said first and said second battery power supply units.

16. The crankarm according to claim 5, wherein the cavity cover is a watertight cover.

17. The crankarm according to claim 1, wherein the battery power supply unit powers at least one electrical/electronic component coupled with components of a transmission of the bicycle other than the crankarm.

18. The crankarm according to claim 1, wherein the recharging port comprises two electrical contacts for connection with a recharging device comprising two matched contacts, which are powered by an external source, wherein the two electrical contacts of the recharging port are of the flush type, and wherein at least one metallic element is provided at the recharging port for magnetic matching with at least one magnet of the recharging device.

19. A bicycle crankarm comprising a main body extending between a rotation axis (X) and a pedal axis of the crankarm, and having a recharging port for a battery power supply unit, wherein said recharging port is on a face of the main body of the crankarm and includes at least one magnet that mates with a corresponding magnetic element of a charging device or with at least one metallic element of a charging device, or includes at least one metallic element that mates with at least one magnet of a recharging device.

20. A bicycle crankset comprising a first crankarm and a second crankarm, each of said first and second crankarms comprising a main body extending between a rotation axis (X) and a pedal axis, at least one of said first or second crankarms includes a battery power supply unit recharging port and one of a magnetic or metallic element on a face of the main body that is positioned to mate magnetically with one of a magnetic or metallic element on a charging device.

21. A bicycle crankset comprising first and second crankarms, each crankarm having a main body extending between a rotation axis (X) and a pedal axis; at least one of said first or second crankarms includes a battery power charging port on a face of the main body and one of a magnetic or metallic element that is positioned to mate magnetically with one of a magnetic or metallic element on a charging device and connect said charging device to said battery power charging port.

* * * * *